(12) United States Patent
Howe

(10) Patent No.: US 12,155,463 B2
(45) Date of Patent: Nov. 26, 2024

(54) SYNCHRONISATION SYSTEM AND METHOD

(71) Applicant: TGOMA NZ LIMITED, Christchurch (NZ)

(72) Inventor: John Robert Howe, Christchurch (NZ)

(73) Assignee: TGOMA NZ LIMITED, Christchurch (NZ)

(*) Notice: Subject to any disclaimer, the term of this patent is extended or adjusted under 35 U.S.C. 154(b) by 659 days.

(21) Appl. No.: 17/426,950

(22) PCT Filed: Apr. 1, 2020

(86) PCT No.: PCT/IB2020/053069
§ 371 (c)(1),
(2) Date: Jul. 29, 2021

(87) PCT Pub. No.: WO2020/202013
PCT Pub. Date: Oct. 8, 2020

(65) Prior Publication Data
US 2022/0103277 A1    Mar. 31, 2022

Related U.S. Application Data

(60) Provisional application No. 62/827,434, filed on Apr. 1, 2019.

(51) Int. Cl.
*H04W 56/00* (2009.01)
*A63B 5/11* (2006.01)
(Continued)

(52) U.S. Cl.
CPC .............. *H04J 3/0661* (2013.01); *A63B 5/11* (2013.01); *A63B 71/0616* (2013.01);
(Continued)

(58) Field of Classification Search
CPC ..... H04W 56/002; H04W 4/80; H04W 84/18; H04W 56/005; H04J 3/0661; A63B 5/11;
(Continued)

(56) References Cited

U.S. PATENT DOCUMENTS 5,566,180 A * 10/1996 Eidson ...................... G06F 1/14
370/473
6,944,188 B2 * 9/2005 Sinha ...................... H04L 7/042
370/328
(Continued)

FOREIGN PATENT DOCUMENTS

CN    101017179    8/2007
CN    105344087    2/2016
(Continued)

OTHER PUBLICATIONS

European Search Report in corresponding EP application # EP 20784260 Dec. 5, 2022.
(Continued)

*Primary Examiner* — Ahmed Elallam
(74) *Attorney, Agent, or Firm* — Niels Haun; Dann, Dorfman, Herrell & Skillman, P.C.

(57) ABSTRACT

An aspect of the invention provides a method of synchronising a first clock of a first device and a second clock of a second device comprising. The method includes transmitting 302 a dummy packet from the second device to the first device over a wireless network; determining 304 a time D2 on the second clock associated to a time that the second device initiates transmission of the dummy packet; determining 306 a time D1 on the first clock associated to the time that the first device receives transmission of the dummy packet; transmitting 308 a value of D2 from the second
(Continued)

device to the first device; and applying 310 a correction to the first clock based at least partly on a difference between D1 and D2.

24 Claims, 7 Drawing Sheets

(51) Int. Cl.
*A63B 71/06* (2006.01)
*H04J 3/06* (2006.01)
*H04W 84/18* (2009.01)

(52) U.S. Cl.
CPC ...... *A63B 71/0686* (2013.01); *A63B 2220/62* (2013.01); *A63B 2225/50* (2013.01)

(58) Field of Classification Search
CPC ............ A63B 71/0616; A63B 71/0686; A63B 2220/62; A63B 2220/833; A63B 2225/50; A63B 71/06; A63B 2220/803; H04L 7/0012
See application file for complete search history.

(56) References Cited

U.S. PATENT DOCUMENTS

| | | | |
|---|---|---|---|
| 7,545,316 B2 * | 6/2009 | Gilkes | G01S 19/256 342/357.64 |
| 9,164,494 B2 | 10/2015 | Hansen | |
| 9,186,548 B2 | 11/2015 | House | |
| 10,010,752 B2 | 7/2018 | Meschter | |
| 10,039,947 B2 | 8/2018 | Conrad | |
| 10,140,779 B2 * | 11/2018 | Kolen | A61B 5/11 |
| 11,393,328 B2 * | 7/2022 | Kadota | G04G 5/00 |
| 11,846,646 B2 * | 12/2023 | Varone | G01P 1/07 |
| 2014/0337473 A1 | 11/2014 | Frusina | |
| 2016/0330533 A1 | 11/2016 | Mangaud | |
| 2017/0157444 A1 | 6/2017 | Conrad | |
| 2017/0195980 A1 * | 7/2017 | Aggarwal | H04W 56/005 |
| 2019/0038932 A1 | 2/2019 | Eckblad | |

FOREIGN PATENT DOCUMENTS

| | | |
|---|---|---|
| CN | 108939390 | 12/2018 |
| SU | 1363277 | 12/1987 |

OTHER PUBLICATIONS

International Preliminary Report On Patentability, Response To Written Opinion in International app# PCT/IB2020/053069, Oct. 12, 2020.

International Search Report and the Written Opinion of the International Searching Authority in International app# PCT/IB2020/053069; Apr. 23, 2020.

\* cited by examiner

SYNCHRONISATION SYSTEM AND METHOD

RELATED APPLICATIONS

This application is a national stage application under 35 U.S.C. 371 for International Application No. PCT/IB2020/053069, which claims the benefit of priority of U.S. Provisional Application No. 62/827,434, filed on Apr. 1, 2019, the entire contents of which application are incorporated herein by reference.

FIELD OF THE INVENTION

The invention relates to methods and systems for synchronising the respective clocks of two devices. The invention is particularly suited for use in synchronising the clocks of sensors attached to respective trampolines.

BACKGROUND TO THE INVENTION

In synchronised trampolining, two athletes perform exactly the same routine of ten skills at the same time on two adjacent trampolines. Fewer points are deducted for lack of synchronisation if the pair are bouncing at the same height at the same time.

Sensors attached to the trampoline beds of adjacent trampolines detect bounce activity in the form of impact and depart event timestamps. These timestamps are used to measure the extent of synchronisation between two pairs of athletes.

However, the timestamps are based on each sensor's internal clock. The internal clocks of different sensors are likely to be associated to different times. Therefore the relative differences in impact event times on the adjacent trampolines will be unknown.

In the absence of synchronised internal clocks it is problematic to score the synchronisation of athletes.

It is an object of at least preferred embodiments of the present invention to address at least some of the aforementioned disadvantages. An additional or alternative object is to at least provide the public with a useful choice.

SUMMARY OF THE INVENTION

In accordance with an aspect of the invention, a method of synchronising a first clock of a first device and a second clock of a second device comprises: transmitting a dummy packet from the second device to the first device over a wireless network; determining a time $D_2$ on the second clock associated to a time that the second device initiates transmission of the dummy packet; determining a time $D_1$ on the first clock associated to the time that the first device receives transmission of the dummy packet; transmitting a value of $D_2$ from the second device to the first device; and applying a correction to the first clock based at least partly on a difference between $D_1$ and $D_2$.

The term 'comprising' as used in this specification means 'consisting at least in part of'. When interpreting each statement in this specification that includes the term 'comprising', features other than that or those prefaced by the term may also be present. Related terms such as 'comprise' and 'comprises' are to be interpreted in the same manner.

In an embodiment determining the time $D_2$ comprises: selecting a threshold for timer $t_1$ so as to cause $t_1$ to overflow at a time that is shorter than an expected transmission time of the dummy packet; observing a time $C_2$ on the second clock on detecting an overflow of timer $t_1$; and determining the time $D_2$ from a difference between $C_2$ and $t_1$.

In an embodiment the method further comprises: transmitting a plurality of data packets in addition to the dummy packet from the second device to the first device over the wireless network; and selecting the threshold for timer $t_1$ so as to cause $t_1$ to overflow at a time that is longer than an expected transmission time of any data packet in the plurality of data packets.

In an embodiment determining the time $D_1$ comprises: selecting a threshold for timer $t_2$ so as to cause $t_2$ to overflow at a time that is shorter than an expected transmission time of the dummy packet; observing a time $C_1$ on the first clock on detecting an overflow of timer $t_2$; and determining the time $D_1$ from a difference between $C_1$ and $t_2$.

In an embodiment the threshold for timer $t_1$ is equal to the threshold for timer $t_2$.

In an embodiment the method further comprises: transmitting a plurality of data packets in addition to the dummy packet from the second device to the first device over the wireless network; and selecting the threshold for timer $t_2$ so as to cause $t_2$ to overflow at a time that is longer than an expected transmission time of any data packet in the plurality of data packets and is shorter than an expected transmission time of the dummy packet.

In an embodiment the expected transmission time of the dummy packet is longer than the expected transmission times of each data packet of the plurality of data packets.

In an embodiment applying the correction to the first clock comprises: determining a clock error $\varepsilon$ from a difference between $D_1$ and $D_2$; and determining a value associated to the second clock from a sum of a reading of the first clock and $\varepsilon$.

In accordance with a further aspect of the invention a clock synchronisation system comprises: a wireless network; a first device connected to the wireless network, the first device having a first clock; and a second device connected to the wireless network, the second device having a second clock. The second device is configured to: transmit a dummy packet from the second device to the first device over the wireless network, determine a time $D_2$ on the second clock associated to a time that the second device initiates transmission of the dummy packet, and transmit a value of $D_2$ from the second device to the first device. The first device is configured to: determine a time $D_1$ on the first clock associated to the time that the first device receives transmission of the dummy packet, and apply a correction to the first clock based at least partly on a difference between $D_1$ and $D_2$.

In an embodiment the second device is configured to determine the time $D_2$ by: selecting a threshold for timer $t_1$ so as to cause $t_1$ to overflow at a time that is shorter than an expected transmission time of the dummy packet; observing a time $C_2$ on the second clock on detecting an overflow of timer $t_1$; and determining the time $D_2$ from a difference between $C_2$ and $t_1$.

In an embodiment the second device is further configured to: transmit a plurality of data packets in addition to the dummy packet from the second device to the first device over the wireless network; and select the threshold for timer $t_1$ so as to cause $t_1$ to overflow at a time that is longer than an expected transmission time of any data packet in the plurality of data packets.

In an embodiment the first device is configured to determine the time $D_1$ by: selecting a threshold for timer $t_2$ so as to cause $t_2$ to overflow at a time that is shorter than an expected transmission time of the dummy packet; observing a time $C_1$ on the first clock on detecting an overflow of timer $t_2$; and determining the time $D_1$ from a difference between $C_1$ and $t_2$.

In an embodiment the threshold for timer $t_1$ is equal to the threshold for timer $t_2$.

In an embodiment the second device is further configured to: transmit a plurality of data packets in addition to the dummy packet from the second device to the first device over the wireless network; and select the threshold for timer $t_2$ so as to cause $t_2$ to overflow at a time that is longer than an expected transmission time of any data packet in the plurality of data packets and is shorter than an expected transmission time of the dummy packet.

In an embodiment the expected transmission time of the dummy packet is longer than the expected transmission times of each data packet of the plurality of data packets.

In an embodiment the first device is configured to apply the correction to the first clock by: determining a clock error $\varepsilon$ from a difference between $D_1$ and $D_2$; and determining a value associated to the second clock from a sum of a reading of the first clock and $\varepsilon$.

In accordance with a further aspect of the invention a computer-readable medium has stored thereon computer-executable instructions that, when executed by a processing unit of a computing device, cause the computing device to perform a method of synchronising a first clock of a first device and a second clock of a second device. The method comprises: transmitting a dummy packet from the second device to the first device over a wireless network; determining a time $D_2$ on the second clock associated to a time that the second device initiates transmission of the dummy packet; determining a time $D_1$ on the first clock associated to the time that the first device receives transmission of the dummy packet; transmitting a value of $D_2$ from the second device to the first device; and applying a correction to the first clock based at least partly on a difference between $D_1$ and $D_2$.

In an embodiment determining the time $D_2$ comprises: selecting a threshold for timer $t_1$ so as to cause $t_1$ to overflow at a time that is shorter than an expected transmission time of the dummy packet; observing a time $C_2$ on the second clock on detecting an overflow of timer $t_1$; and determining the time $D_2$ from a difference between $C_2$ and $t_1$.

In an embodiment the method further comprises: transmitting a plurality of data packets in addition to the dummy packet from the second device to the first device over the wireless network; and selecting the threshold for timer $t_1$ so as to cause $t_1$ to overflow at a time that is longer than an expected transmission time of any data packet in the plurality of data packets.

In an embodiment determining the time $D_1$ comprises: selecting a threshold for timer $t_2$ so as to cause $t_2$ to overflow at a time that is shorter than an expected transmission time of the dummy packet; observing a time $C_1$ on the first clock on detecting an overflow of timer $t_2$; and determining the time $D_1$ from a difference between $C_1$ and $t_2$.

In an embodiment the threshold for timer $t_1$ is equal to the threshold for timer $t_2$.

In an embodiment the method further comprises: transmitting a plurality of data packets in addition to the dummy packet from the second device to the first device over the wireless network; and selecting the threshold for timer $t_2$ so as to cause $t_2$ to overflow at a time that is longer than an expected transmission time of any data packet in the plurality of data packets and is shorter than an expected transmission time of the dummy packet.

In an embodiment the expected transmission time of the dummy packet is longer than the expected transmission times of each data packet of the plurality of data packets.

In an embodiment applying the correction to the first clock comprises: determining a clock error $\varepsilon$ from a difference between $D_1$ and $D_2$; and determining a value associated to the second clock from a sum of a reading of the first clock and $\varepsilon$.

The invention in one aspect comprises several steps. The relation of one or more of such steps with respect to each of the others, the apparatus embodying features of construction, and combinations of elements and arrangement of parts that are adapted to affect such steps, are all exemplified in the following detailed disclosure.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

In addition, where features or aspects of the invention are described in terms of Markush groups, those persons skilled in the art will appreciate that the invention is also thereby described in terms of any individual member or subgroup of members of the Markush group.

As used herein, '(s)' following a noun means the plural and/or singular forms of the noun.

As used herein, the term 'and/or' means 'and' or 'or' or both.

As used herein, the term 'connected to' in relation to data or signal transfer includes all direct or indirect types of communication, including wired and wireless, via a cellular network, via a data bus, or any other computer structure. It is envisaged that they may be intervening elements between the connected integers. Variants such as 'in communication with', 'joined to', and 'attached to' are to be interpreted in a similar manner. Related terms such as 'connecting' and 'in connection with' are to be interpreted in the same manner.

As used herein, the terms 'component', 'module', 'system', 'interface', and/or the like in relation to a processor are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9, and 10) and also any range of rational numbers within that range (for example, 2 to 8, 1.5 to 5.5, and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

Although the present invention is broadly as defined above, those persons skilled in the art will appreciate that the invention is not limited thereto and that the invention also includes embodiments of which the following description gives examples.

BRIEF DESCRIPTION OF THE DRAWINGS

Preferred forms of the methods and systems for synchronising the respective clocks of two devices will now be described by way of example only with reference to the accompanying figures in which.

DETAILED DESCRIPTION

Figure 1:
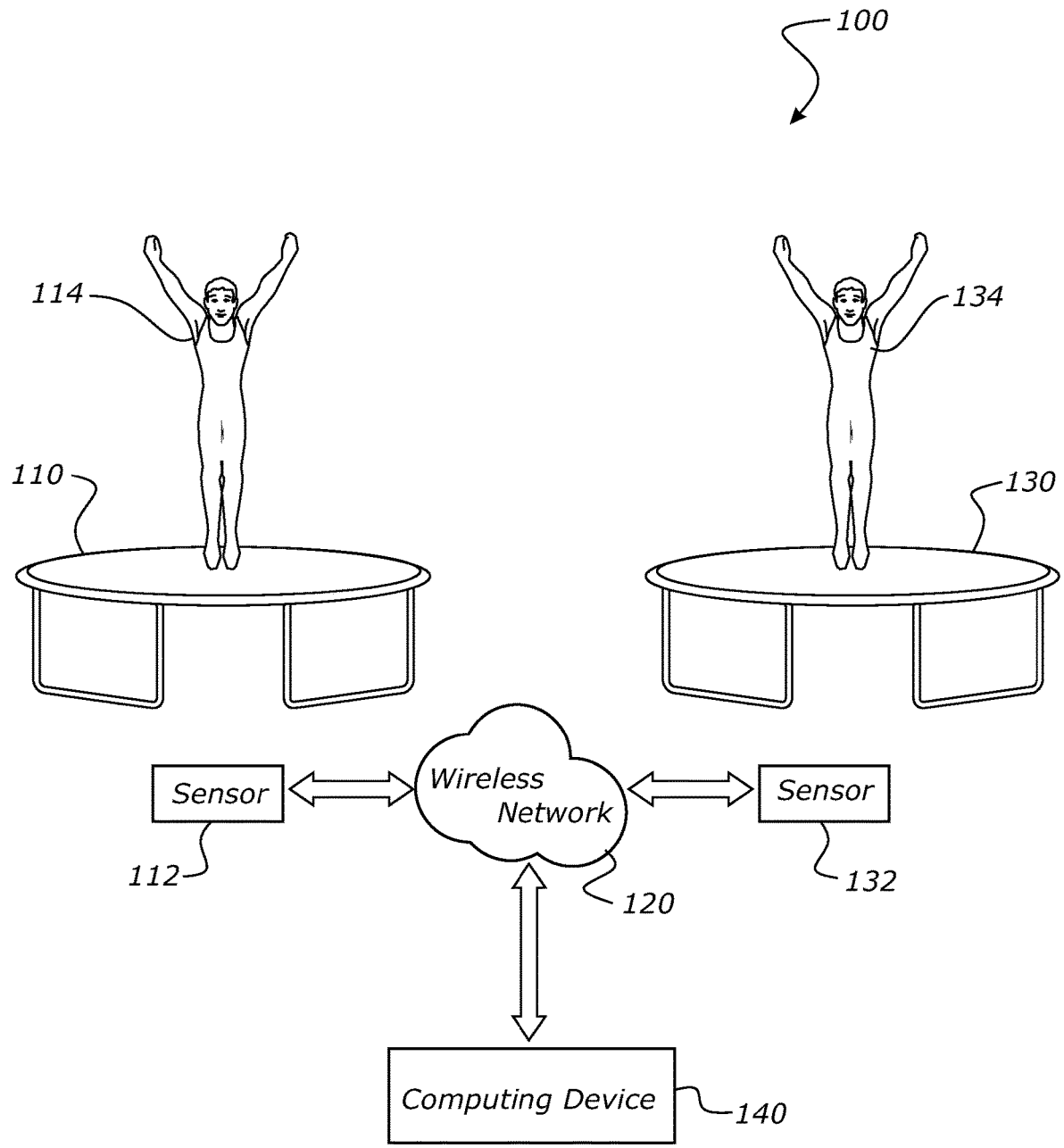
FIG. 1 shows an overview of one environment in which synchronisation is required.

FIG. 1 shows one system 100 in which synchronisation of the respective clocks of two devices is required. A first trampoline 110 has an attached sensor 112. In an embodiment the sensor 112 is attached to the side of a trampoline mat. The sensor 112 is configured to detect bounce activity.

An athlete 114 impacting the trampoline mat causes an impact event. The sensor 112 detects the impact event. The sensor 112 checks an internal clock associated to the sensor 112. The sensor 112 then generates an impact event timestamp based on its internal clock. The impact event timestamp is broadcast over a wireless network 120 to other devices and components attached to the wireless network 120.

Similarly, the athlete departing the trampoline mat causes a depart event. The sensor 112 detects the depart event and checks its internal clock to generate a depart event timestamp. The depart event timestamp is broadcast over the wireless network 120 to other devices and components attached to the wireless network 120.

The system 100 includes a second trampoline 130 having an attached sensor 132. In an embodiment the sensor 132 is attached to the side of the trampoline mat and detects bounce activity in a similar manner to sensor 112.

An athlete 134 jumping on the trampoline 130 causes the sensor 132 to detect impact events and depart events in a similar manner to sensor 112. The sensor 132 generates impact event timestamps and depart event timestamps based on its internal clock. The impact event timestamps and depart event timestamps are broadcast over the wireless network 120 to other devices and components attached to the wireless network 120.

In an embodiment the wireless network 120 includes a Bluetooth network. Sensor 112 and/or sensor 132 transmit the impact event timestamps and depart event timestamps as Bluetooth LE beacons.

A computing device 140 is connected to the wireless network 120. The computing device 140 receives the impact event timestamps and depart event timestamps from the sensor 112 and/or sensor 132. Examples of computing devices include mobile phones, tablets, laptops and desktop computers.

In an embodiment the computing device 140 calculates time-of-flight for athletes 114 and/or 134 based at least partly on differences between impact event timestamps and depart event timestamps. For example, the time-of-flight for athlete 114 can be calculated from the respective differences between consecutive depart event timestamps and impact event timestamps received from sensor 112.

In an embodiment, a synchro deduction is determined for a plurality of skills and a total synchro deduction determined based on the sum of individual synchro deductions. Synchro deductions are calculated by differences between impact event timestamps on adjacent trampolines. Depart event timestamps are typically used for time-of-flight, which is not usually a factor in synchronised competitions.

The impact event timestamps and depart event timestamps generated by sensor 112 are based on the internal clock of sensor 112. On the other hand, the impact event timestamps and depart event timestamps generated by sensor 132 are based on the internal clock of sensor 132. Comparing an impact event timestamp of sensor 112 with a corresponding impact event timestamp of sensor 132 is problematic as the internal clocks of each sensor are different.

Figure 2:
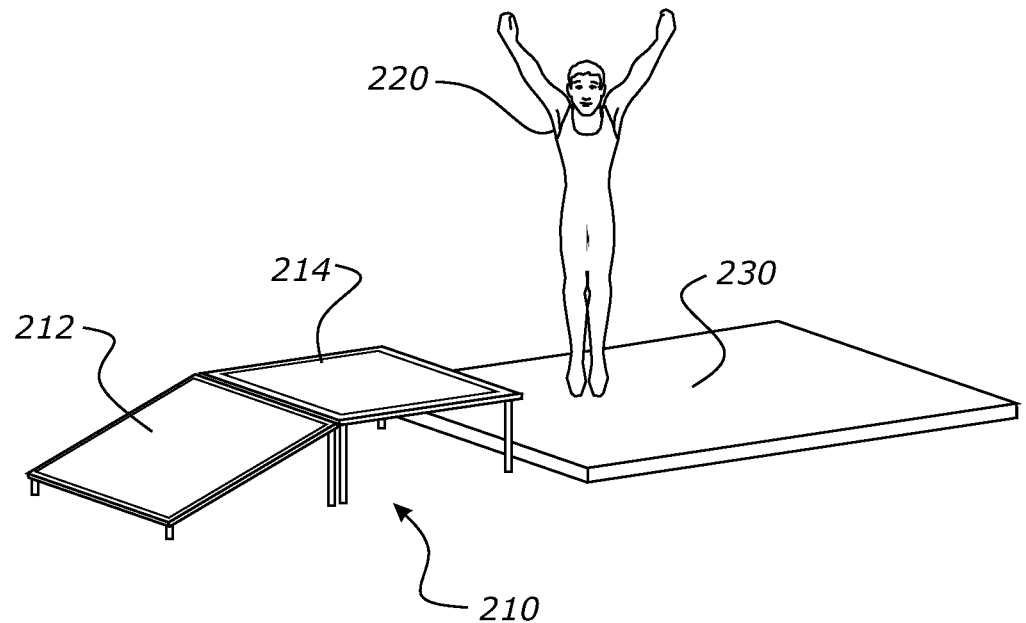
FIG. 2 shows an overview of another environment in which synchronisation is required.
Figure 2:
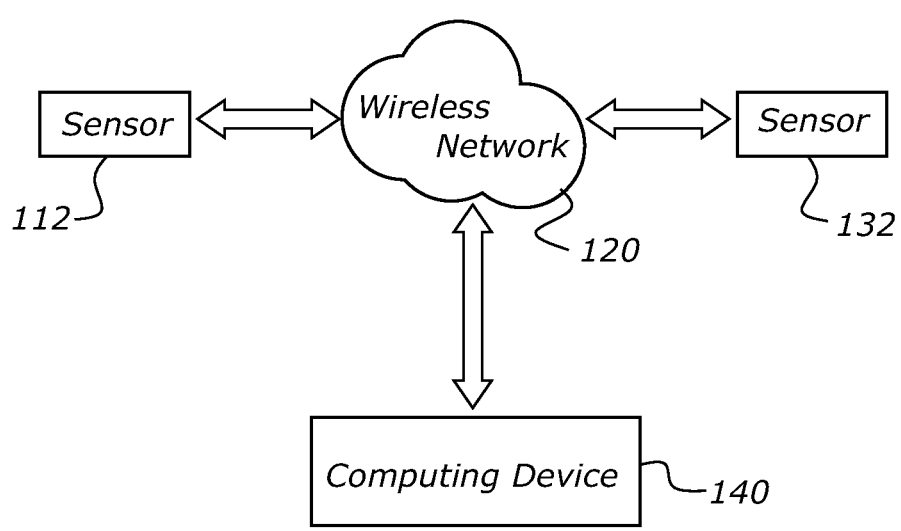

FIG. 2 shows another system 200 in which synchronisation of the respective clocks of two devices is required. A double mini-trampoline 210 has a sloped jumping surface 212 and a flat jumping surface 214. A double mini-trampoline competition typically includes two types of a pass, a mounter pass and a spotter pass.

In a mounter pass, an athlete 220 runs toward the double mini-trampoline 210, performs a first bounce or mount bounce on jumping surface 212, performs a second bounce or dismount bounce on the jumping surface 214, then lands on a mat 230. The athlete performs a first skill after the first bounce and a second skill after the second bounce.

In a spotter pass, the athlete 220 runs toward the double mini-trampoline 210 and performs a first bounce on the jumping surface 212. Instead of performing a skill, the athlete performs a straight jump from the jumping surface 212, landing on the jumping surface 214. The athlete departs the jumping surface 214, performs a first skill, and lands on the jumping surface 214 a second time. The athlete departs the jumping surface 214 a second time and performs a second skill as the athlete dismounts, landing on the mat 230.

In an embodiment, the sensor 112 is attached to a bed of the double mini-trampoline. In one example the sensor 112 is attached near an edge of the double mini-trampoline in a space between jumping surface 212 and jumping surface 214. In an embodiment the sensor 112 is attached to a mat of the double mini-trampoline between the jumping surface 212 and jumping surface 214. The sensor 112 is configured to detect bounce activity.

In a mounter pass for example, the athlete 220 impacting the jumping surface 212 causes a first impact event. The sensor 112 detects the first impact event. The sensor 112 checks an internal clock associated to the sensor 112. The sensor 112 then generates a first impact event timestamp based on its internal clock. The first impact event timestamp is broadcast over the wireless network 120 to other devices and components attached to the wireless network 120.

The athlete 220 departing the jumping surface 212 causes a first depart event. The sensor 112 detects the first depart event and checks its internal clock to generate a first depart event timestamp. The first depart event timestamp is broadcast over the wireless network 120 to other devices and components attached to the wireless network 120.

After departing the jumping surface 212 the athlete impacts the jumping surface 214 causing a second impact event. The sensor 112 detects the second impact event. The sensor 112 checks an internal clock associated to the sensor 112. The sensor 112 then generates a second impact event timestamp based on its internal clock. The second impact event timestamp is broadcast over the wireless network 120 to other devices and components attached to the wireless network 120.

In an embodiment the sensor 132 is attached to the mat 230. The sensor 132 detects bounce activity in a similar manner to sensor 112.

The athlete 220 departing the jumping surface 214 causes a second depart event. The sensor 112 detects the second depart event and checks its internal clock to generate a second depart event timestamp. The second depart event timestamp is broadcast over the wireless network 120 to other devices and components attached to the wireless network 120.

After departing the jumping surface 214 the athlete 220 impacts the mat 230 causing a third impact event. The sensor 132 detects the third impact event. The sensor 132 generates a third impact event timestamp based on its internal clock. The third impact event timestamp is broadcast over the wireless network 120 to other devices and components attached to the wireless network 120.

In a spotter pass for example, the athlete 220 impacting the flat jumping surface 214 for the first time causes the first impact event. The athlete 220 departing the flat jumping surface 214 for the first time causes the first depart event. The athlete 220 impacting the jumping surface 214 for the second time causes the second impact event. Departing the jumping surface 214 for the second time causes the second depart event. The third impact event is caused when the athlete 220 impacts the mat 230.

In an embodiment the wireless network 120 includes a Bluetooth network. Sensor 112 and/or sensor 132 transmit the impact event timestamps and depart event timestamps as Bluetooth LE beacons.

A computing device 140 is connected to the wireless network 120. Examples of computing devices include mobile phones, tablets, laptops and desktop computers.

In an embodiment the computing device 140 receives at least the first depart event timestamp and the second impact event timestamp from the sensor 112. In an embodiment the computing device 140 receives at least the second depart event timestamp from the sensor 112 and the third impact event timestamp from the sensor 132. In an embodiment the computing device 140 receives one or more of: the first impact event timestamp, the first depart event timestamp, the second impact event timestamp, the second depart event timestamp, the third impact event timestamp.

In an embodiment the computing device 140 calculates time-of-flight for each jump performed by the athlete 220.

For example the time-of-flight for a first jump may be calculated at least partly based on differences between the first depart event timestamp generated by the sensor 112 and the second impact event timestamp generated by the sensor 112.

In another example the time-of-flight for a second jump may be calculated at least partly based on differences between the second depart event timestamp generated by the sensor 112 and the third impact event timestamp generated by the sensor 132.

The first impact event timestamp, the first depart event timestamp, the second impact event timestamp, and the second depart event timestamp generated by sensor 112 are based on the internal clock of sensor 112. On the other hand, the third impact event timestamp generated by sensor 132 is based on the internal clock of sensor 132.

Calculating a difference between for example the second depart event timestamp generated by sensor 112 and the third impact event timestamp generated by sensor 132 is problematic as the internal clocks of sensor 112 and sensor 132 are different in most cases.

Figure 3:
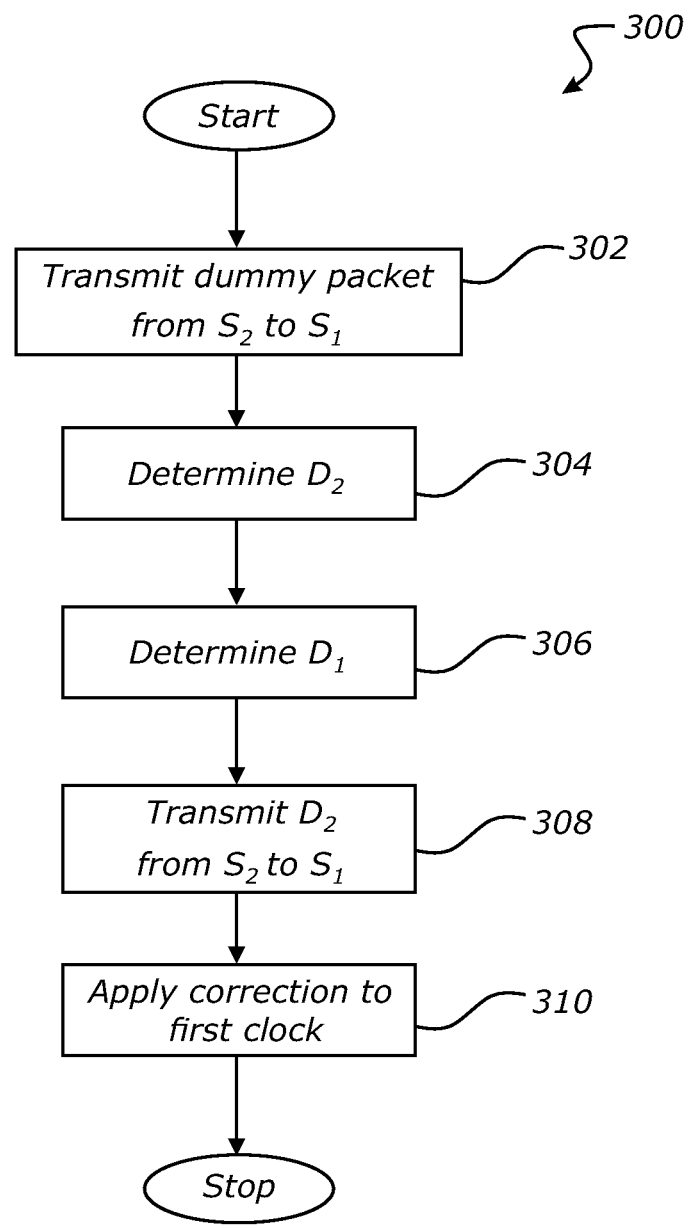
FIG. 3 is a high-level flow chart showing synchronisation of the clocks of the sensors shown in FIG. 1.

FIG. 3 is a high-level flow chart showing a method 300 for synchronisation of the internal clock of sensor 112 with the internal clock of sensor 132, for example. The sensors 112 and 132 are directly paired with each other over the wireless network 120 for example Bluetooth LE.

The method includes sensor 132 sending a timestamp to sensor 112. One problem with just sending a timestamp between sensor 132 and sensor 112 is that the Bluetooth stack introduces unknown and varying delays. These delays can occur on the transmitting end between when firmware sends a data packet and when the actual transmission occurs. These delays can also occur on the receiving end when the transmission occurs and when the application receives the data at the top of the stack.

In an attempt to mitigate this unknown delay, the sensor 132 transmits 302 a dummy packet from the sensor 132 to the sensor 112 over the wireless network 120. The dummy packet is distinct from the data packets.

The sensor 132 has a local timestamp $D_2$ for transmission of the dummy packet. The method includes determining 304 the timestamp $D_2$ from the internal clock of sensor 132. Timestamp $D_2$ is associated to a time that the sensor 132 initiates transmission of the dummy packet.

The sensor 112 has a local timestamp $D_1$ for receipt of transmission of the dummy packet. The method includes determining 306 the timestamp $D_1$ from the internal clock of sensor 112. Timestamp $D_1$ is associated to the time that sensor 112 receives transmission of the dummy packet. It is assumed that the difference in time between transmission on sensor 132 and receiving on sensor 112 is negligible.

Examples of techniques for determining $D_2$ and $D_1$ are further described below. It is expected that the values of $D_1$ and $D_2$ will be different to each other even though they are associated to transmission and receipt of the same dummy packet. The timestamps $D_1$ and $D_2$ are based on the internal clocks of sensors 112 and 132 respectively. The internal clocks are different to each other in most cases.

Sensor 132 transmits 308 a data packet or series of data packets containing the timestamp $D_2$ from sensor 132 to sensor 112 over the wireless network 120. The sensor 112 receives the timestamp $D_2$ from sensor 132.

Sensor 112 applies 310 a correction to a reading of the internal clock of sensor 112 based at least partly on a difference between $D_1$ and $D_2$. It is assumed that the timestamps $D_1$ and $D_2$ are associated to the same event. Therefore a clock error $\varepsilon$ is determined as a difference between $D_1$ and $D_2$.

A timestamp obtained from the internal clock of sensor 112 added to clock error $\varepsilon$ can be assumed to be the same as a timestamp obtained from the internal clock of sensor 132. In this way the internal clock of the sensor 112 can be synchronised with the internal clock of the sensor 132 by obtaining a timestamp from the internal clock of sensor 112 and adding a clock error $\varepsilon$.

In an embodiment the method 300 is repeated at regular intervals in order to compensate for clock drift on sensor 112 and/or sensor 132. In an embodiment the method 300 is repeated at a frequency of approximately 1 hz.

Figure 4:
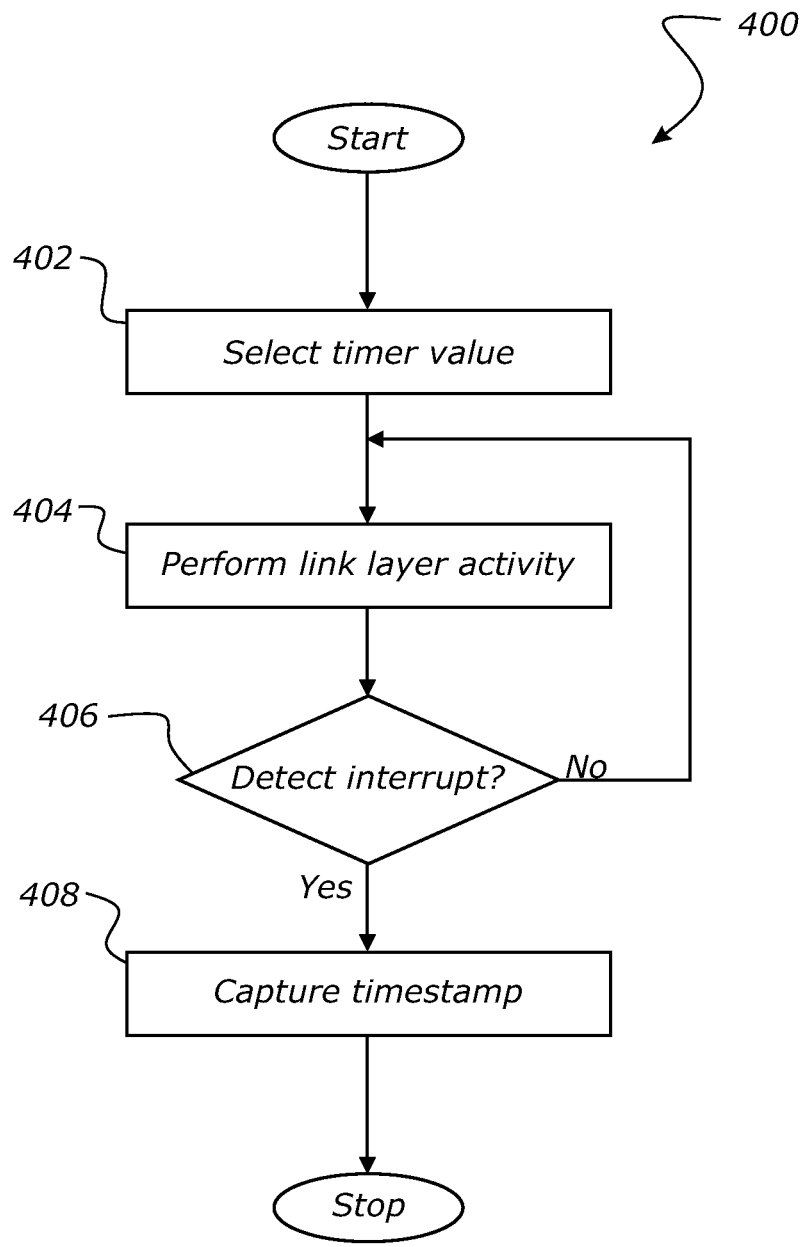
FIG. 4 is a flow chart showing an example of identifying a dummy packet from the data packets.

FIG. 4 shows a method 400 for identifying or distinguishing a dummy packet from the data packets. There will be many data packets transmitted between sensor 112 and sensor 132. In an embodiment the sensors 112 and 132 are enabled with a Bluetooth feature called a Peripheral Reflex System (PRS). The PRS allows different peripheral modules to communicate directly with each other without involving the respective microcontrollers associated to the modules.

A PRS producer is triggered on link-layer Bluetooth RX or TX activity. In an embodiment this feature is used to trigger an interrupt whenever there is link-layer activity. However, this interrupt has the potential to be called for every data packet transmission between the devices. There is potentially a large amount of radio chatter between sensor 112 and sensor 132 even when there is no data being communicated across the wireless network 120.

The PRS is configured to start a timer when the sensor 112 and/or sensor 132 detect Bluetooth link layer activity, and configured to stop the timer when the activity ends. The sensor transmitting a data packet or dummy packet starts a timer $t_1$. The sensor expecting the packet starts a timer $t_2$. In an embodiment an interrupt is triggered on detecting timer overflow of either $t_1$ or $t_2$. Timer overflow includes a situation in which the timer $t_1$ and/or $t_2$ counts up and reaches or overflows a threshold. The term 'overflow' in relation to a timer includes the value of a timer reaching or exceeding a threshold.

In an embodiment timer $t_1$ and/or $t_2$ counts down and underflows when the timer reaches zero or below zero before the activity ends.

In an embodiment the method includes selecting 402 a threshold for timer $t_1$ so that timer $t_1$ will only overflow for the dummy packet. The dummy packet is configured to be of a sufficiently large size that the timer $t_2$ will always overflow while the dummy packet is in the process of being transmitted from sensor 132 to sensor 112.

The sensor 112 and sensor 132 perform 404 routine link layer activity. In an embodiment this routine link layer activity includes transmitting a plurality of data packets from sensor 112 to sensor 132 and from sensor 132 to sensor 112 over the wireless network 120. The timer threshold value(s) for $t_1$ and $t_2$ is/are selected so that this routine link layer activity does not cause either timer $t_1$ or timer $t_2$ to overflow. In an embodiment the threshold value(s) for $t_1$ and/or $t_2$ is/are selected so as to overflow at a time that is longer than an expected transmission time of any data packet in the plurality of data packets but is shorter than an expected transmission time of the dummy packet.

If the sensor 112 and/or sensor 132 detects 406 an interrupt it is assumed that a dummy packet has been transmitted over the network 120 causing timer $t_1$ or $t_2$ to overflow.

On detecting an interrupt, the value of the internal clock of the sensor 112 and/or sensor 132 is observed or captured 408. In an embodiment, observing the internal clock value of sensor 112 yields a timestamp of $C_1$. In an embodiment, observing the internal clock value of sensor 132 yields a timestamp of $C_2$.

Referring to FIGS. 3 and 4, the step of determining 304 a value for $D_2$ in an embodiment is based at least partly on a difference between the timestamp $C_2$ observed in step 408 and the timer value $t_2$ selected in step 402.

In an embodiment the step of determining 306 a value for $D_1$ in an embodiment is based at least partly on a difference between the timestamp $C_1$ observed in step 408 and the timer value $t_1$ selected in step 402. In an embodiment the value of timer $t_1$ is equal to the value of timer $t_2$.

Figure 5:
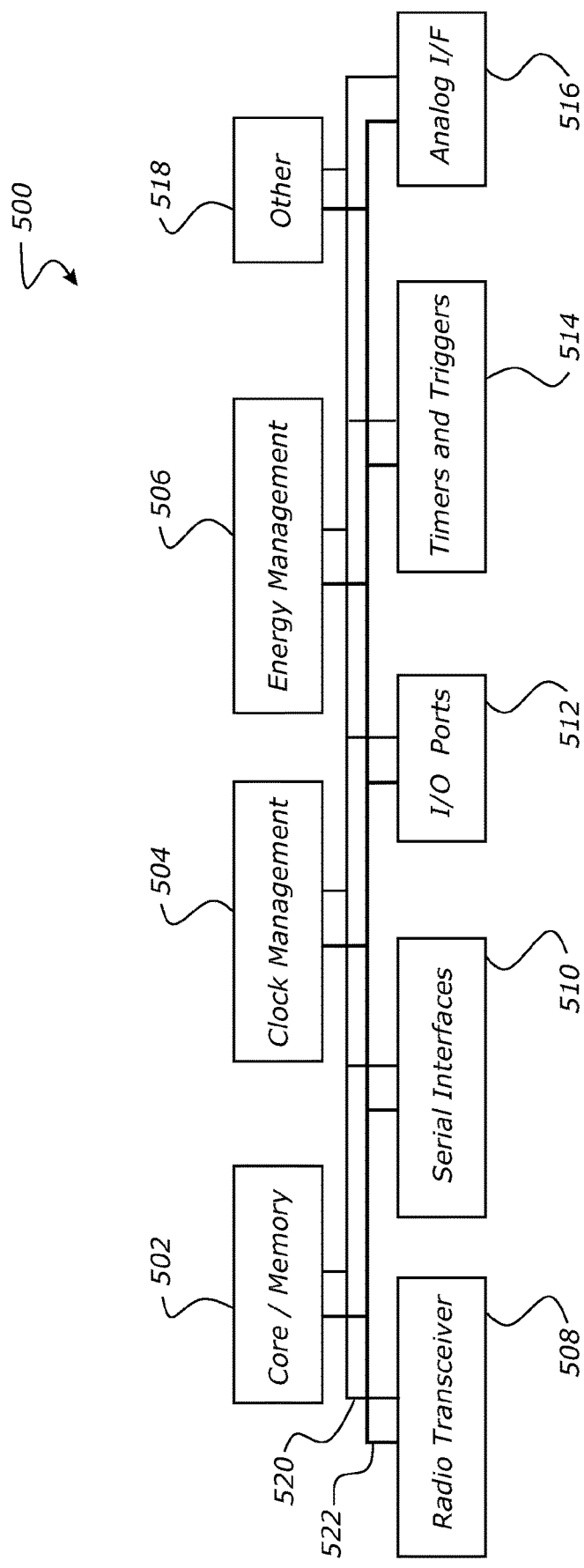
FIG. 5 is an example of a sensor from FIG. 1 and/or FIG. 2.

FIG. 5 shows an example of a sensor 112 and/or sensor 132 from FIG. 1 and/or FIG. 2. In an embodiment the sensor 500 includes core/memory 502. The memory includes for example a memory protection unit, flash program memory, RAM memory, debug interface and/or DMA controller.

A clock management module 504 includes for example high frequency crystal oscillator, a low frequency crystal oscillator, low frequency RC oscillator, high frequency RC oscillator, auxiliary high frequency RC oscillator and/or ultra low frequency RC oscillator.

An energy management module 506 includes a voltage regulator, DC-DC converter, brown-out detector, voltage monitor and/or power-on reset.

In an embodiment the sensor 500 further includes radio transceiver 508, serial interfaces 510 and/or I/O ports 512. Timers and triggers 514 include timer/counter, low energy timer, pulse counter, protocol timer, watchdog timer, real time counter and calculator and/or cryotimer.

An analog I/F 516 includes ADC, Analog comparator and/or IDAC. Other modules 518 include a crypto module and/or CRC module.

At least some of the modules are connected to other modules by 32-bit bus 520 and/or Peripheral Reflex System (PRS) 522.

Figure 6:
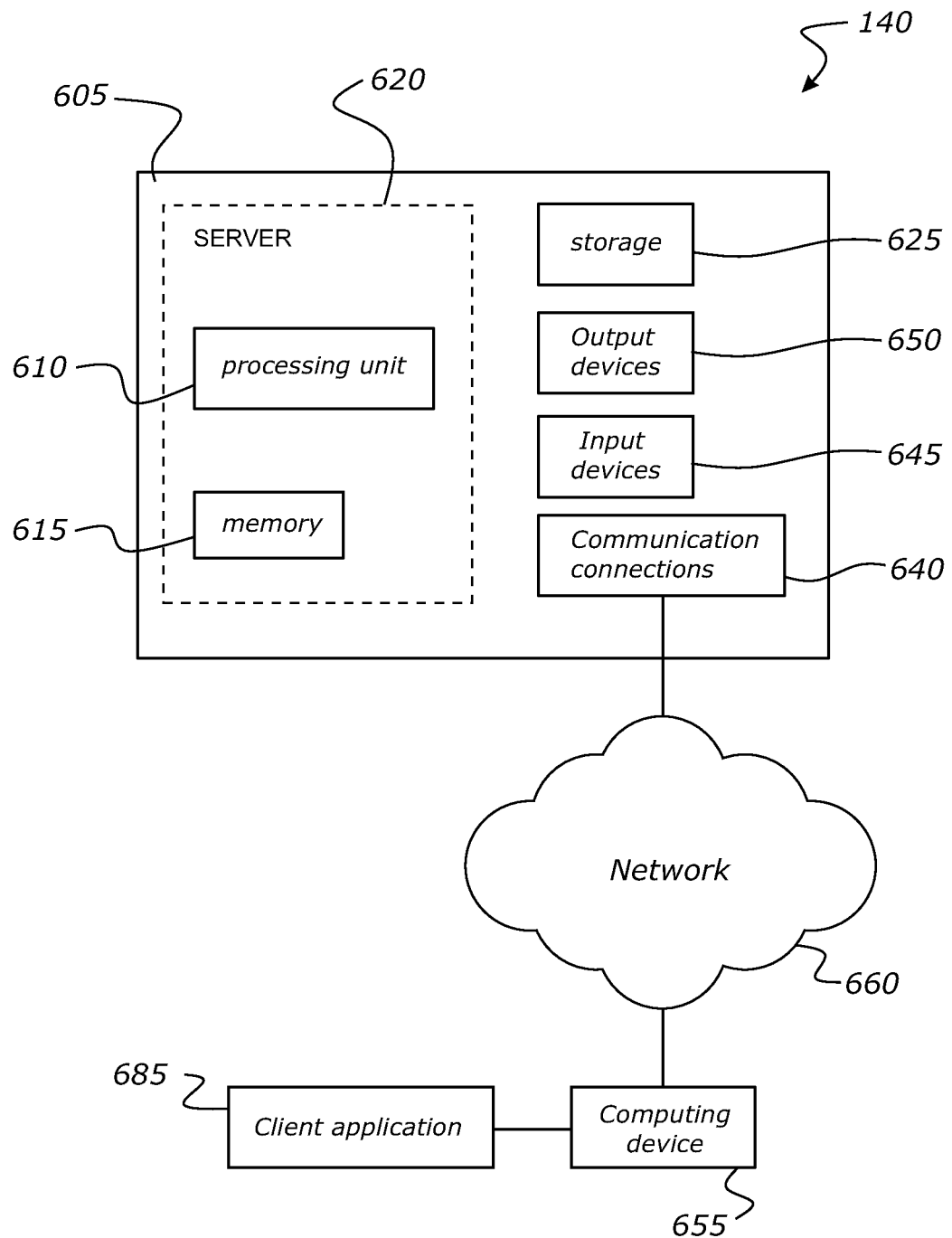
FIG. 6 is an example of a processor from FIG. 1 and/or FIG. 2.

FIG. 6 is an example of a computing device 140 from FIG. 1 and/or FIG. 2. The computing device 140 is an example of a suitable computing device. It is not intended to suggest any limitation as to the scope of use or functionality of the operating environment.

Example computing devices include, but are not limited to, personal computers, server computers, hand-held or laptop devices, mobile devices, multiprocessor systems, consumer electronics, mini computers, mainframe computers, and distributed computing environments that include any of the above systems or devices. Examples of mobile devices include mobile phones, smartphones, tablets, and Personal Digital Assistants (PDAs).

Although not required, embodiments are described in the general context of 'computer readable instructions' being executed by one or more computing devices. In an embodiment, computer readable instructions are distributed via tangible computer readable media.

In an embodiment, computer readable instructions are implemented as program modules. Examples of program modules include functions, objects, Application Programming Interfaces (APIs), and data structures that perform particular tasks or implement particular abstract data types. Typically, the functionality of the computer readable instructions is combined or distributed as desired in various environments.

Shown in FIG. 6 is a computing device 140 comprising a primary computing device 605 configured to implement one or more embodiments described above. In an embodiment, computing device 605 includes at least one processing unit 610 and memory 615. Depending on the exact configuration and type of computing device, memory 615 is volatile (such as RAM, for example), non-volatile (such as ROM, flash memory, etc., for example) or some combination of the two.

A server 620 is shown by a dashed line notionally grouping processing unit 610 and memory 615 together.

In an embodiment, computing device 605 includes additional features and/or functionality. One example is removable and/or non-removable additional storage including, but not limited to, magnetic storage and optical storage. Such additional storage is illustrated in FIG. 6 as storage 625.

In an embodiment, computer readable instructions to implement one or more components provided herein are maintained in storage 625.

In an embodiment, storage 625 stores other computer readable instructions to implement an operating system and/or an application program. Computer readable instructions are loaded into memory 615 for execution by processing unit 610, for example.

Memory 615 and storage 625 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by computing device 605. Any such computer storage media may be part of device 605.

In an embodiment, computing device 605 includes at least one communication connection 640 that allows device 605 to communicate with other devices. The at least one communication connection 640 includes one or more of a modem, a Network Interface Card (NIC), an integrated network interface, a radio frequency transmitter/receiver, an infrared port, a USB connection, or other interfaces for connecting computing device 605 to other computing devices.

In an embodiment the at least one communication connection 640 includes Bluetooth L.E. components. The communication connection 640 is configured to receive bounce event timings from the sensor 112 and/or sensor 132.

In an embodiment, communication connection(s) 640 facilitate a wired connection, a wireless connection, or a combination of wired and wireless connections. Communication connection(s) 640 transmit and/or receive communication media.

Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

In an embodiment, device 605 includes at least one input device 645 such as a physical keyboard, mouse, pen, voice input device, touch input device, infrared cameras, video input devices, and/or any other input device. Device 605 also includes at least one output device 650 such as one or more displays, speakers, printers, and/or any other output device.

Input device(s) 645 and output device(s) 650 are connected to device 605 via a wired connection, wireless connection, or any combination thereof. In an embodiment, an input device or an output device from another computing device is/are used as input device(s) 645 or output device(s) 650 for computing device 605.

In an embodiment, components of computing device 605 are connected by various interconnects, such as a bus. Such interconnects include one or more of a Peripheral Component Interconnect (PCI), such as PCI Express, a Universal Serial Bus (USB), firewire (IEEE 13104), and an optical bus structure. In an embodiment, components of computing device 605 are interconnected by a network. For example, memory 615 in an embodiment comprises multiple physical memory units located in different physical locations interconnected by a network.

It will be appreciated that storage devices used to store computer readable instructions may be distributed across a network. For example, in an embodiment, a computing device 655 accessible via a network 660 stores computer readable instructions to implement one or more embodiments provided herein.

Computing device 605 accesses computing device 655 in an embodiment and downloads a part or all of the computer readable instructions for execution. Alternatively, computing device 605 downloads portions of the computer readable instructions, as needed. In an embodiment, some instructions are executed at computing device 605 and some at computing device 655.

In an embodiment, a client application 685 is provided as a thin client application configured to run within a web browser. In an embodiment the client application 685 is provided as an application on a user device. It will be appreciated that application 685 in an embodiment is associated to computing device 605 or another computing device.

Figure 7:
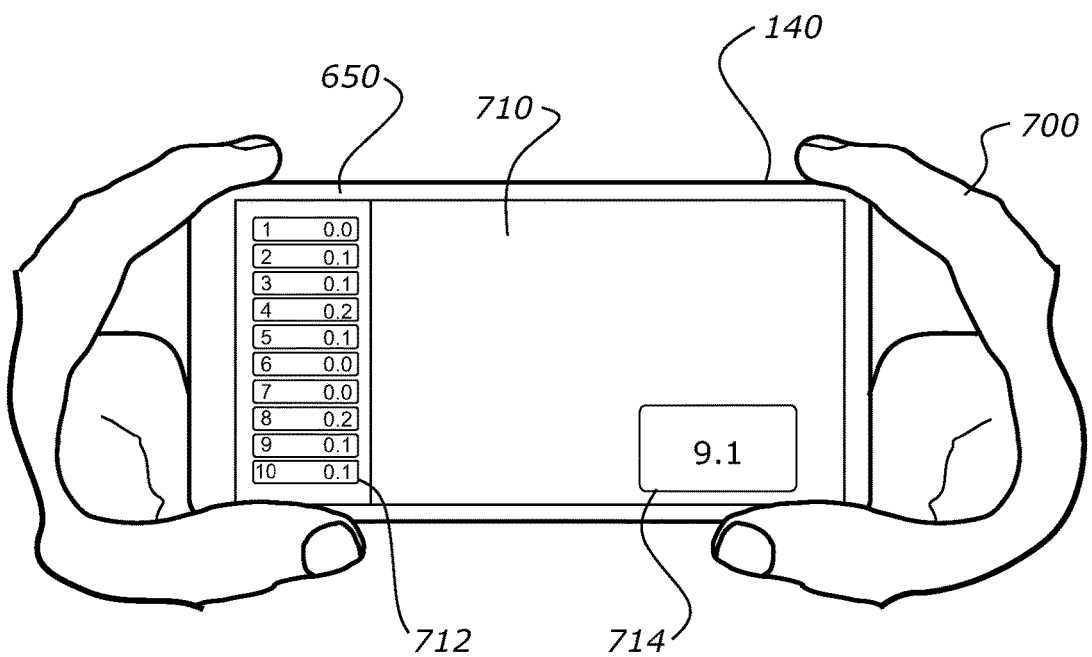
FIG. 7 shows an example of computer-readable instructions executing on the computing device in the environment shown in FIG. 1.

FIG. 7 shows an example of computer-readable instructions causing the computing device 140, when in the form of a mobile device, to perform the methods described above with reference to FIG. 1.

A user 700 orients the computing device 140 so that an input device 645 in the form of a camera (not shown) captures images of the two athletes 114 and 134 bouncing on adjacent trampolines 110 and 130 respectively.

Still images and/or video footage of the athletes is displayed on an output device 650 in the form of a touch-sensitive screen within a display panel 710. In an embodiment the user 700 operates a capture feature to record video footage of the athletes.

The computing device 140 receives data from the sensor 112 and/or sensor 132. In an embodiment the data includes impact event timestamps from sensor 112 and sensor 132. In an embodiment a skills panel 712 displayed on output device 650 shows a synchro deduction for each of ten skills performed by the athletes. The synchro deduction in this case is the difference between the impact event timestamps for two athletes performing the same skill.

In an embodiment a syncho panel 714 displayed on output device 650 shows a synchro deduction for the athlete pair's performance. The synchro deduction could include the sum of the synchro deductions displayed in the skills panel 712.

Figure 8:
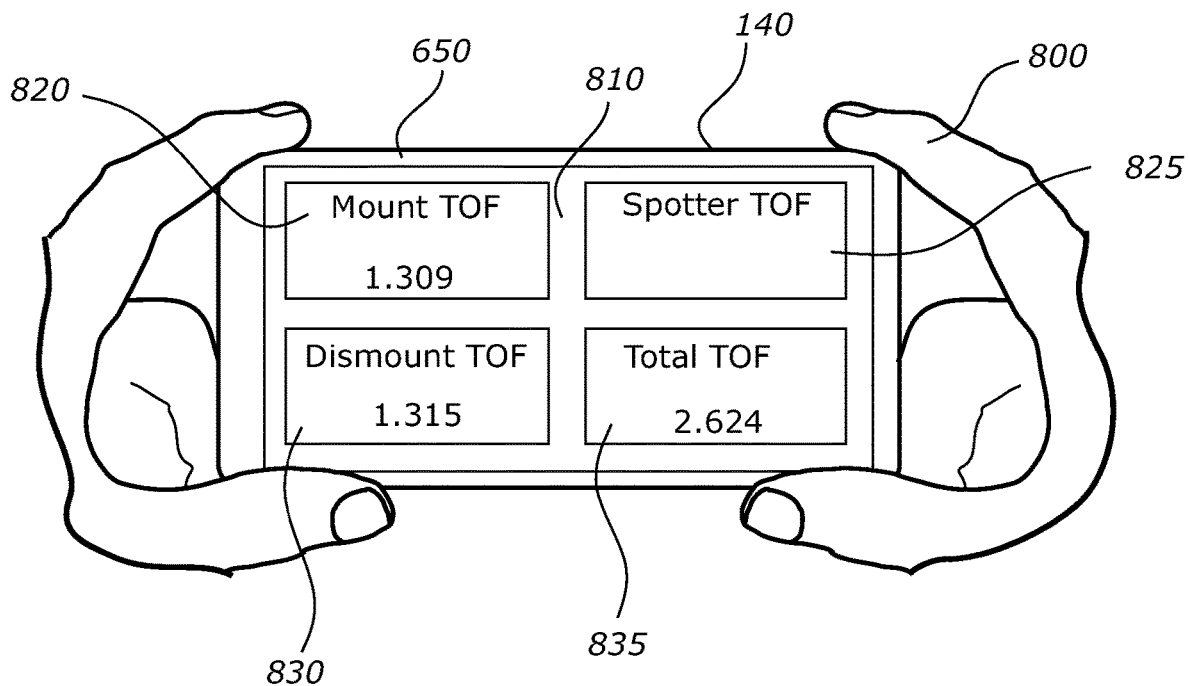
FIG. 8 shows an example of computer-readable instructions executing on the computing device in the environment shown in FIG. 2.

FIG. 8 shows an example of computer-readable instructions causing the computing device 140, when in the form of a mobile device, to perform the methods described above with reference to FIG. 2.

A user 800 orients the computing device 140 so that an input device 645 in the form of a camera (not shown) captures images of the athlete 220 performing on the double mini-trampoline 210.

In an embodiment, still images and/or video footage of the athlete 220 is displayed on an output device 650 in the form of a touch-sensitive screen within a display panel 810. In an embodiment the user 800 operates a capture feature to record video footage of the athlete 220

The computing device 140 receives data from the sensor 112 and/or sensor 132. In an embodiment the data includes impact and depart event timestamps from sensor 112, impact and depart event timestamps from sensor 132, and impact event timestamps from mat 230.

In an embodiment the display panel 810 shows assessments of skill of the athlete 220. Examples include a Mount ToF panel 820, a Spotter ToF panel 825, a Dismount ToF panel 830 and a Total ToF panel 835.

Where the athlete 220 is performing a mounter pass, the Mount Time of Flight (ToF) panel 820 shows for example the time of flight of the athlete 220 between departing jumping surface 212 and impacting jumping surface 214. In an embodiment the Mount ToF is calculated at least partly from the difference between the first depart event timestamp from jumping surface 212 and the second impact event timestamp from jumping surface 214.

Where the athlete is performing a spotter pass, the Spotter Time of Flight (ToF) panel 825 shows for example the time of flight of the athlete 220 between departing jumping surface 214 for the first time and impacting jumping surface 214 for the second time. In an embodiment, the Spotter ToF is calculated at least partly from the difference between the first depart event timestamp from jumping surface 214 and the second impact event timestamp from jumping surface 214.

The Dismount Time of Flight (ToF) panel 830 for example the time of flight of the athlete 220 between departing jumping surface 214 and impacting the mat 230. In an embodiment the Dismount ToF is calculated at least partly from the difference between the second depart event timestamp from jumping surface 214 and the third impact event timestamp from mat 230.

Where the athlete 220 is performing a mounter pass, the Total Time of Flight (ToF) panel 835 shows the sum of the values shown in Mount ToF panel 820 and Dismount ToF panel 830. Where the athlete 220 is performing a spotter pass, the Total ToF panel 835 shows the sum of the values shown in Spotter ToF panel 825 and Dismount ToF panel 830.

The foregoing description of the invention includes preferred forms thereof. Modifications may be made thereto without departing from the scope of the invention, as defined by the accompanying claims.

The invention claimed is:

1. A method of synchronising a first clock of a first device and a second clock of a second device, the method comprising:
   transmitting a dummy packet from the second device to the first device over a wireless network, the dummy packet being distinct from a data packet;
   determining a time $D_2$ on the second clock associated to a time that the second device initiated transmission of the dummy packet;
   determining a time $D_1$ on the first clock associated to the time that the first device received transmission of the dummy packet;
   transmitting a value of $D_2$ from the second device to the first device; and
   applying a correction to the first clock based at least partly on a difference between $D_1$ and $D_2$,
   wherein the first device and second device are first and second sensors configured to detect bounce activity of trampolines.

2. The method of claim 1 wherein determining the time $D_2$ comprises:
   selecting a threshold for timer $t_1$ so as to cause $t_1$ to overflow at a time that is shorter than an expected transmission time of the dummy packet;
   observing a time $C_2$ on the second clock on detecting an overflow of timer t; and
   determining the time $D_2$ from a difference between $C_2$ and $t_1$.

3. The method of claim 2 further comprising:
   transmitting a plurality of data packets in addition to the dummy packet from the second device to the first device over the wireless network; and
   selecting the threshold for timer $t_1$ so as to cause $t_1$ to overflow at a time that is longer than an expected transmission time of any data packet in the plurality of data packets.

4. The method of claim 2 wherein determining the time $D_1$ comprises:
   selecting a threshold for timer $t_2$ so as to cause $t_2$ to overflow at a time that is shorter than an expected transmission time of the dummy packet;
   observing a time $C_1$ on the first clock on detecting an overflow of timer $t_2$; and
   determining the time $D_1$ from a difference between $C_1$ and $t_2$.

5. The method of claim 4 wherein the threshold for timer $t_1$ is equal to the threshold for timer $t_2$.

6. The method of claim 4 further comprising:
   transmitting a plurality of data packets in addition to the dummy packet from the second device to the first device over the wireless network; and
   selecting the threshold for timer $t_2$ so as to cause $t_2$ to overflow at a time that is longer than an expected transmission time of any data packet in the plurality of data packets and is shorter than an expected transmission time of the dummy packet.

7. The method of claim 6 wherein the expected transmission time of the dummy packet is longer than the expected transmission times of each data packet of the plurality of data packets.

8. The method of claim 1 wherein applying the correction to the first clock comprises:
   determining a clock error & from a difference between $D_1$ and $D_2$; and
   determining a value associated to the second clock from a sum of a reading of the first clock and ε.

9. A clock synchronisation system comprising:
   a wireless network;
   a first device connected to the wireless network, the first device having a first clock; and
   a second device connected to the wireless network, the second device having a second clock, the second device is configured to:
   transmit a dummy packet from the second device to the first sensor device over the wireless network, the dummy packet being distinct from a data packet;
   determine a time $D_2$ on the second clock associated to a time that the second device initiated transmission of the dummy packet, and
   transmit a value of $D_2$ from the second device to the first device;
   wherein the first sensor device is configured to:
   determine a time $D_1$ on the first clock associated to the time that the first device received transmission of the dummy packet, and apply a correction to the first clock based at least partly on a difference between $D_1$ and $D_2$, wherein the first device and second device are first and second sensors configured to detect bounce activity of respective trampolines.

10. The clock synchronisation system of claim 9 wherein the second device is configured to determine the time $D_2$ by:
   selecting a threshold for timer $t_1$ so as to cause $t_1$ to overflow at a time that is shorter than an expected transmission time of the dummy packet;
   observing a time $C_2$ on the second clock on detecting an overflow of timer $t_1$; and
   determining the time $D_2$ from a difference between $C_2$ and $t_1$.

11. The clock synchronisation system of claim 10 wherein the second device is further configured to:
   transmit a plurality of data packets in addition to the dummy packet from the second device to the first device over the wireless network; and
   select the threshold for timer $t_1$ so as to cause $t_1$ to overflow at a time that is longer than an expected transmission time of any data packet in the plurality of data packets.

12. The clock synchronisation system of claim 10 wherein the first device is configured to determine the time $D_1$ by:
   selecting a threshold for timer $t_2$ so as to cause $t_2$ to overflow at a time that is shorter than an expected transmission time of the dummy packet;
   observing a time $C_1$ on the first clock on detecting an overflow of timer $t_2$; and
   determining the time $D_1$ from a difference between $C_1$ and $t_2$.

13. The clock synchronisation system of claim 12 wherein the threshold for timer $t_1$ is equal to the threshold for timer $t_2$.

14. The clock synchronisation system of claim 12 wherein the second device is further configured to:
   transmit a plurality of data packets in addition to the dummy packet from the second device to the first device over the wireless network; and
   select the threshold for timer $t_2$ so as to cause $t_2$ to overflow at a time that is longer than an expected transmission time of any data packet in the plurality of data packets and is shorter than an expected transmission time of the dummy packet.

15. The clock synchronisation system of claim 14 wherein the expected transmission time of the dummy packet is longer than the expected transmission times of each data packet of the plurality of data packets.

16. The clock synchronisation system of claim 9 wherein the first device is configured to apply the correction to the first clock by:
   determining a clock error ε from a difference between $D_1$ and $D_2$; and
   determining a value associated to the second clock from a sum of a reading of the first clock and ε.

17. A computer-readable medium having stored thereon computer-executable instructions that, when executed by a processing unit of a computing device, cause the computing device to perform a method of synchronising a first clock of a first sensor device and a second clock of a second device, the method comprising:
   transmitting a dummy packet from the second device to the first device over a wireless network, the dummy packet being distinct from a data packet;
   determining a time $D_2$ on the second clock associated to a time that the second device initiated transmission of the dummy packet;
   determining a time $D_1$ on the first clock associated to the time that the first device received transmission of the dummy packet;
   transmitting a value of $D_2$ from the second device to the first device; and
   applying a correction to the first clock based at least partly on a difference between $D_1$ and $D_2$, wherein the first device and second device are first and second sensors configured to detect bounce activity of trampolines.

18. The computer-readable medium of claim 17 wherein determining the time $D_2$ comprises:
   selecting a threshold for timer $t_1$ so as to cause $t_1$ to overflow at a time that is shorter than an expected transmission time of the dummy packet;
   observing a time $C_2$ on the second clock on detecting an overflow of timer $t_1$; and
   determining the time $D_2$ from a difference between $C_2$ and $t_1$.

19. The computer-readable medium of claim 18 wherein the method further comprises:
   transmitting a plurality of data packets in addition to the dummy packet from the second device to the first device over the wireless network; and
   selecting the threshold for timer $t_1$ so as to cause $t_1$ to overflow at a time that is longer than an expected transmission time of any data packet in the plurality of data packets.

20. The computer-readable medium of claim 18 wherein determining the time $D_1$ comprises:
   selecting a threshold for timer $t_2$ so as to cause $t_2$ to overflow at a time that is shorter than an expected transmission time of the dummy packet;
   observing a time $C_1$ on the first clock on detecting an overflow of timer $t_2$; and
   determining the time $D_1$ from a difference between $C_1$ and $t_2$.

21. The computer-readable medium of claim 20 wherein the threshold for timer $t_1$ is equal to the threshold for timer $t_2$.

22. The computer-readable medium of claim 20 wherein the method further comprises:
   transmitting a plurality of data packets in addition to the dummy packet from the second device to the first device over the wireless network; and
   selecting the threshold for timer $t_2$ so as to cause $t_2$ to overflow at a time that is longer than an expected transmission time of any data packet in the plurality of data packets and is shorter than an expected transmission time of the dummy packet.

23. The computer-readable medium of claim 22 wherein the expected transmission time of the dummy packet is longer than the expected transmission times of each data packet of the plurality of data packets.

24. The computer-readable medium of claim 17 wherein applying the correction to the first clock comprises:
   determining a clock error ε from a difference between $D_1$ and $D_2$; and
   determining a value associated to the second clock from a sum of a reading of the first clock and ε.

* * * * *